(12) United States Patent
Van Loosdrecht et al.

(10) Patent No.: US 7,273,553 B2
(45) Date of Patent: Sep. 25, 2007

(54) METHOD FOR THE TREATMENT OF WASTE WATER WITH SLUDGE GRANULES

(75) Inventors: Marinus C. Van Loosdrecht, De Lier (NL); Merle K. De Kreuk, Em Gouda (NL)

(73) Assignee: DHV Water BV, Amersfoorl (NL)

( * ) Notice: Subject to any disclaimer, the term of this patent is extended or adjusted under 35 U.S.C. 154(b) by 0 days.

(21) Appl. No.: 10/527,970

(22) PCT Filed: Sep. 16, 2003

(86) PCT No.: PCT/NL03/00642

§ 371 (c)(1),
(2), (4) Date: Jul. 22, 2005

(87) PCT Pub. No.: WO2004/024638

PCT Pub. Date: Mar. 25, 2004

(65) Prior Publication Data

US 2006/0032815 A1 Feb. 16, 2006

(30) Foreign Application Priority Data

Sep. 16, 2002 (NL) .................................... 1021466

(51) Int. Cl.
*C02F 3/30* (2006.01)
*C02F 3/12* (2006.01)

(52) U.S. Cl. ........................ 210/605; 210/615; 210/617

(58) Field of Classification Search ................ 210/605, 210/608, 615–617, 620, 630
See application file for complete search history.

(56) References Cited

U.S. PATENT DOCUMENTS

| 5,582,733 | A | * | 12/1996 | Desbos et al. ............. 210/605 |
| 5,599,451 | A | * | 2/1997 | Guiot ........................ 210/605 |
| 6,024,876 | A | * | 2/2000 | Pannier et al. ............. 210/616 |
| 6,306,302 | B1 | * | 10/2001 | Maree et al. ............... 210/605 |
| 7,060,185 | B2 | * | 6/2006 | Kim et al. .................. 210/605 |
| 2004/0206700 | A1 | * | 10/2004 | Kim et al. .................. 210/605 |

FOREIGN PATENT DOCUMENTS

| EP | 0 776 864 A1 | 6/1997 |
| JP | 5-337492 | * 12/1993 |
| WO | WO-03/070649 A1 | 8/2003 |

OTHER PUBLICATIONS

Patent Abstracts of Japan, Publication No. 05-337492, Mitsubishi Kakoki Kaisha Ltd., Dec. 21, 1993.

(Continued)

*Primary Examiner*—Fred G. Prince
(74) *Attorney, Agent, or Firm*—Darby & Darby

(57) ABSTRACT

The invention relates to a method for the treatment of waste water comprising an organic nutrient. According to the invention, the waste water is in a first step fed to sludge granules, after the supply of the waste water to be treated the sludge granules are fluidised in the presence of an oxygen-comprising gas, and in a third step, the sludge granules are allowed to settle in a settling step. This makes it possible to effectively remove not only organic nutrients but optionally also nitrogen compounds and phosphate.

9 Claims, 1 Drawing Sheet

OTHER PUBLICATIONS

Figure 1:
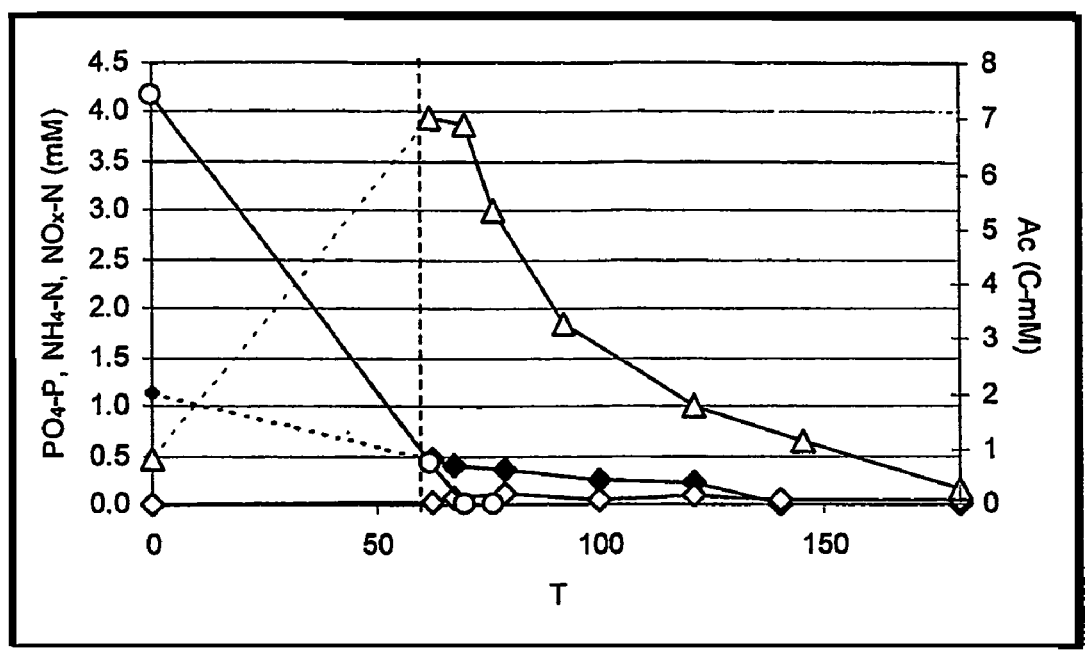

Beun, J. J., et al., "N-Removal in a Granular Sludge Sequencing Batch Airlift Reactor", Biotechnology and Bioengineering, Oct. 5, 2001, vol. 75, No. 1, pp. 82-92.

Morgenroth, E., et al., "Aerobic Granular Sludge in a Sequencing Batch Reactor", Water Research, 1997, vol. 31, No. 12, pp. 3191-3194.

Dangcong, Peng, et al., "Aerobic Granular Sludge—A Case Report", Water Research, 1999, vol. 33, No. 3, pp. 890-893.

Beun, J.J., et al., "Aerobic granulation in a sequencing batch airlift reactor", Water Research, 2002, vol. 36, pp. 702-712.

* cited by examiner

METHOD FOR THE TREATMENT OF WASTE WATER WITH SLUDGE GRANULES

The present invention relates to a method for the treatment of waste water comprising an organic nutrient, wherein the waste water is brought into contact with microorganisms-comprising sludge particles, an oxygen-comprising gas is fed to the sludge particles, and the method further comprises the settling of the sludge particles and the discharge of organic nutrient-depleted waste water.

Such a method is known in the art, for example, from U.S. Pat. No. 3,864,246. Waste water having a high rate of biological oxygen demand (BOD) is mixed with sludge flocs. The thus obtained sludge flocs-containing waste water is brought into contact with oxygen (air). The conditions chosen augment the growth of sludge flocs (that is to say biomass particles) that have improved settling properties. This reduces the time necessary for separating the microorganisms (in particular bacteria) that provide biological breakdown, from the waste water.

A drawback of the known method, despite the improved settling velocity, is that the implementation of the method requires a relatively large surface area, that is to say large-scale purification occupies an undesirable amount of space.

It is an object of the present application to improve the method, while occupying less space in comparison with the known method.

To this end the method according to the invention is characterised in that in a first step the waste water is fed to sludge granules, after the supply of the waste water to be treated an oxygen-comprising gas is introduced in a second step, with the granules being in a fluidised condition and in a third step, a settling step, the sludge granules are allowed to settle.

This allows the method to be carried out in a relatively limited reactor volume. This may reduce the occupation of space down to a fifth. The reaction conditions chosen promote the formation of sludge granules (as opposed to sludge flocs) with excellent settling properties. Moreover, the conditions in the first step are oxygen-depleted, and in practice they are anaerobic, since there is no oxygen added. In the first step the sludge granules take up organic nutrients from the supplied waste water, and they are stored inside the microorganisms in the form of a polymer, such as polybetahydroxybutyrate. Should oxygen be supplied in the first step, this must not be in an amount that would prevent the storage of organic nutrient. In the second step, breakdown of the stored organic nutrients occurs under aerobic conditions. In addition, this aerobic second step may effect the breakdown of possibly present ammonium into nitrate. In the second step also the interior of the sludge granules is anaerobic and this is where the stored organic nutrients are broken down utilising nitrate. This produces nitrogen gas, resulting in an effective reduction of the N-content in the waste water. For the elimination of N-compounds to be broken down, the oxygen concentration in the second step is less than 5 mg/ml, and preferably less than 2 mg/ml. In this way the use of pre-positioned or post-positioned reactors for the removal of nitrogen compounds can be avoided, or their purifying capacity can be down-scaled, which means a saving in costs. The present invention also makes it possible to eliminate phosphate. To this end, in a step that is not the first step, and preferably at the end of the second step or at the beginning of the third step, sludge granules are removed. Surprisingly it so happens, that under the conditions of the present invention phosphate accumulating microorganisms are not competed out. All the microorganisms needed for the method according to the invention are found in the sludge of purification plants. They do not need to be isolated, since the conditions specified ensure that these microorganisms constitute part of the sludge granules. The conditions according to the invention give rise to the formation of sludge granules that are significantly larger and have a higher density than the sludge flocs obtained according to the conditions as known from U.S. Pat. No. 3,864,246 (see FIG. 1), having a settling velocity >10 m/h (as opposed to approximately 1 m/h for the known sludge flocs) and a sludge volume index <35 ml/g. The sludge volume index is the volume taken up by 1 gram of biomass after 1 hour's settling. For the purification of a subsequent portion of waste water the steps 1 to 3 (one cycle) are repeated. The invention is very suitable for the treatment of sewage water.

In the first step the waste water is preferably fed to a bed of sludge granules, and the sludge granules settle in the third step, forming a bed of sludge granules.

This allows the microorganisms to be exposed to a higher concentration of organic nutrient, which promotes granular growth.

According to a preferred embodiment, the waste water is fed to the bed of sludge granules at a rate such as to avoid fluidisation of the bed.

Since it is to a large extent avoided that present already treated wastewater mixes with waste water to be treated, this allows the microorganism to be exposed to the highest possible concentration of nutrient which, as already mentioned, promotes granular growth. The term "to avoid fluidisation" is understood to mean that the bed does not fluidise, and/or that as a result of introducing the waste water, mixing occurs at most in up to 25% of the height of the bed. The waste water may, for example, be sprayed onto the bed directly or by using means for limiting the force with which the waste water can disturb the bed surface. In any case, mixing will occur at most in up to 25%, preferably in less than 15% of the height of the bed. Instead of introduction from the top side of the bed of sludge granules, the waste water may preferably be introduced from below. Especially in the latter case, the feed rate will be limited such that no fluidisation of the bed occurs. In both cases it is possible to displace and discharge purified water still present between the sludge granules from the bed in an effective manner, i.e. with little or no mixing of waste water and purified (nutrient-depleted) waste water, as will be discussed below. In principle it is also possible to introduce the waste water into the bed of sludge granules via pipes.

According to a preferred embodiment, at least a part of the nutrient-depleted waste water is discharged in the third step, after at least partial settling.

The removal of nutrient-depleted waste water prior to the addition of fresh waste water to be treated means that a smaller reactor volume is needed, and that the microorganism-comprising sludge granules come into contact with a highest possible concentration of nutrients. This is favourable for the formation of sludge granules. The height of liquid in the reactor is for example twice, and preferably 1.5 times or less, such as 1.2 times the height of the bed of settled sludge granules.

According to a preferred embodiment, at least a part of the nutrient-depleted waste water is discharged during the feeding of waste water to the bed of sludge granules in the first step.

In that case, the discharge of nutrient-depleted waste water is preferably the consequence of displacement due to waste water being fed to the bed of sludge granules.

Thus with one single action both the addition of fresh waste water, and the discharge of treated waste water is realised. This can be accomplished at a low capital outlay. Further savings are possible on control technology (fewer measurements are required) and operating costs. Furthermore, mixing of treated waste water with waste water to be treated is avoided, so that the concentration of nutrients to which microorganisms in the sludge granules are exposed is as high as possible, providing the previously mentioned advantage of growth in the form of sludge granules. The displaced treated waste water is preferably discharged at the top side of the bed. Due to the displacement, any flocs that may be formed are flushed out of the reactor. Therefore, the waste water is advantageously introduced via the bottom of the bed.

An important embodiment is one wherein the waste water is introduced in an amount of 50 to 110%, preferably 80 to 105% and most preferably 90 to 100% of the void volume of the bed.

In this way the biomass in the form of sludge granules is utilised optimally, at the smallest possible reactor volume.

The introduction of the waste water is preferably followed by an interval before commencing the second step.

This promotes the uptake of nutrients from the waste water, and contributes to the formation of sludge granules with good settling qualities. If desired, mixing may take place during the interval.

The interval is preferably sufficiently long for the removal of at least 50%, preferably at least 75% and most preferably at least 90% of the organic nutrient from the waste water.

This contributes the most to the formation of sludge granules with good settling qualities, while the purification of the waste water is optimal.

It is preferred for the waste water to be introduced in the third step, wherein sludge granules that settle more slowly are discharged from the reactor and sludge granules that settle more quickly remain in the reactor.

This further increases the pressure to select for granular growth. The introduction of waste water may be performed at a low flow rate during settling of the sludge granules, preferably after at least part the sludge granules have formed a granular bed but, as explained elsewhere, most preferably after the granular bed has formed. In the first two methods there is overlap between the first and third step. In the second and especially in the third method, light sludge flocs that have settled on the bed, or that would have the tendency to do so, are carried away by the flow of nutrient-depleted water displaced by waste water. As a consequence there is a pressure of selection resulting in maintaining the characteristics of the sludge in the form of granules. It is preferred for the discharge to take place in the third step via a discharge opening just above the final bed.

The invention will now be elucidated with reference to the following exemplary embodiment wherein FIG. 1 shows a graph of the acetate, phosphate, ammonium, and $NO_3^-+NO_2^-$ concentration during a cycle of the method according to the invention.

Figure 2A:

FIGS. 2a and b show sludge flocs according to the prior art and sludge granules according to the present invention, respectively.

An air lift reactor (3 liter, height/diameter 20) was fed with 1.5 liters of waste water per cycle, which waste water represents an appropriate model for a domestic waste water. The composition was 6.3 mM sodium acetate; 3.6 mM ammonium chloride, 0.6 mM potassium phosphate, 0.37 mM magnesium sulphate, 0.48 mM potassium chloride and 0.9 ml/l standard solution of trace elements. The reactor was seeded with aerobic active sludge from a domestic waste-water purification plant. The reactor was operated in successive batch cycles. One cycle consisted of the following steps:

i) The introduction of 1.5 liters of model waste water at the bottom side of the reactor, for 60 minutes, so that there is a plug flow regime of waste water through the settled granular bed.

ii) Aeration for 111 minutes at a flow rate of 4 liters of air per minute.

iii) Settling of the granular sludge for 3 minutes after the termination of the aeration.

iv) Discharging the treated model waste water from the effluent outlet point at half the reactor height. Any biomass present at this moment above the effluent outlet point was removed from the reactor together with the treated waste water.

v) 1 minute interval, after which feeding with model waste water was recommenced.

By adding a base or acid, the pH in the reactor was maintained at 6.5 to 7.5 and the temperature was kept at 20° C. During the aerated phase ii) the concentration of dissolved oxygen was maintained at approximately 1.8 mg/ml. On the one hand this keeps the oxygen concentration sufficiently high for aerobic breakdown of nutrient in the external part of the sludge granules, and on the other hand only a low pumping capacity is required for the addition of air. After all, under these conditions, the transfer of oxygen from the air is very efficient. Consequently, there is also little energy required for the supply of oxygen. The breakdown of nitrogen compounds was shown to be optimal at these oxygen concentrations, with only minimal amounts of nitrate being found in the treated waste water.

Figure 2B:
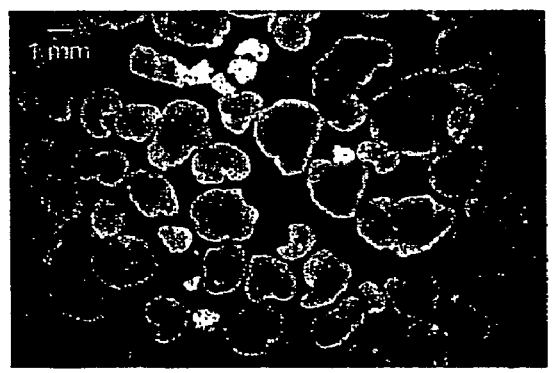

In Table 1 the mean concentrations of the model waste water and the treated water are shown. The mean purification result is also given. FIG. 1 shows the plot of the acetate (o), phosphate (Δ), ammonium (black diamond) and the sum of the nitrate and nitrite (open diamond) concentration during one cycle. FIG. 2b shows a photograph of the sludge granules obtained by the method. The obtained sludge granules were stable for at least 300 days, after which this experiment was stopped. The method according to the invention thus makes a reliable control of the operation possible. FIG. 2a shows typical sludge flocs having a settling rate as described in U.S. Pat. No. 3,864,246. Although U.S. Pat. No. 3,864,246 successfully combats the growth of filamentous organisms, which form so-called light sludge, the sludge flocs formed have a settling velocity of at best 1 m/h. In contrast, the sludge granules according to the present invention have very high settling velocities (>10 m/h), while the distance over which settling takes place may be relatively short.

TABLE 1

Concentrations of the untreated and treated model waste water

| Mean values | Model waste water | Treated waste water | Removal Efficiency |
| --- | --- | --- | --- |
| Acetate (mM) | 6.3 | 0 | 100% |
| $NH_4^+$ (mM) | 3.6 | 0 | 97% |
| $NO_3^-$ (mM) | 0 | 0.1 | |
| $NO_2^-$ (mM) | 0 | 0 | |
| $PO_4$ (mM) | 0.6 | 0.04 | 94% |

One of the factors contributing to granular growth is feeding waste water with a highest possible nutrient concentration to the sludge granules. For this reason it is expedient to avoid mingling between treated waste water in the reactor and freshly supplied waste water. In those cases where a low nutrient concentration in the waste water prevails for many cycles, e.g. more than 10, nutrient may be added to the waste water if necessary. One option would be using liquid manure.

The present invention may be implemented in numerous ways. For example, instead of using one reactor it is propitious to use three reactors, the three reactors being operated out of phase. That is to say, while waste water is fed to one reactor, the aeration step is carried out in a second reactor, while in a third reactor settling takes place and possibly discharge of purified water. This keeps the capital outlay for pumps, especially with regard to their required maximum capacity, within limits. Treated waste water is released gradually and this is advantageous if this waste water needs to undergo a further treatment, since then also a smaller reactor for post-treatment suffices. Since compared with the above described experiment, reactors will in practice be relatively higher, settling will take longer. This means that feeding may take one third of the time, aeration and settling together two thirds of the time. A buffer tank for temporary storage of waste water to be treated is thus avoided and the three batch-operated reactors make continuous operation possible. The invention is illustrated by way of an air-lift reactor, but the invention may be embodied with any other type of reactor, such as a bubble column reactor.

The invention claimed is:

1. A method for the treatment of waste water comprising an organic nutrient, wherein the waste water is brought into contact with microorganisms-comprising sludge particles, an oxygen-comprising gas is fed to the sludge particles, and the method further comprises the settling of the sludge particles and the discharge of organic nutrient-depleted waste water, characterised in that in a first step the waste water is fed to sludge granules, under anaerobic conditions;

after the supply of the waste water to be treated an oxygen-comprising gas is introduced in a second step, with the granules being in a fluidised condition; and in a third step, a settling step, the sludge granules are allowed to settle.

2. A method according to claim 1, characterised in that the waste water is introduced to a bed of sludge granules in an amount of 50 to 110% of the void volume of the bed.

3. A method according to claim 1, characterised in that the introduction of the waste water is followed by an interval before commencing the second step.

4. A method according to claim 3, characterised in that the interval is sufficiently long for the removal of at least 50% of the organic nutrient from the waste water.

5. A method according to claim 3, characterised in that the interval is sufficiently long for the removal of at least 75% of the organic nutrient from the waste water.

6. A method according to claim 3, characterised in that the interval is sufficiently long for the removal of at least 90% of the organic nutrient from the waste water.

7. A method according to claim 1, characterised in that the selection takes place in the third step, wherein the sludge granules that settle more slowly are discharged from the reactor and sludge granules that settle more quickly remain in the reactor.

8. A method according to claim 1, characterised in that the waste water is introduced to a bed of sludge granules in an amount of 80 to 105% of the void volume of the bed.

9. A method according to claim 1, characterised in that the waste water is introduced to a bed of sludge granules in an amount of 90 to 100% of the void volume of the bed.

* * * * *